Patented Mar. 28, 1950

2,501,698

UNITED STATES PATENT OFFICE 2,501,698

THERMAL EXPANSION AND VESICULATION PROCESS FOR SILICEOUS MATERIALS

Glenroy Stecker, Morton Grove, Ill., assignor to Great Lakes Carbon Corporation, Morton Grove, Ill., a corporation of Delaware No Drawing. Application June 5, 1947, Serial No. 752,817

2 Claims. (Cl. 252—378)

This invention relates to a method for producing expanded vesiculated particles from perlitic minerals. More particularly, it relates to a method for producing improved vesiculated particles having greater insulating value and strength at a higher bulk volume than is obtainable by the usual methods of expanding perlitic minerals.

It is known that certain types of perlitic minerals including perlite, other volcanic glasses, pumicite, volcanic ash, and other minerals of a glassy character which contain at least 1% of bound water and generally of the range of about 2 to 6% of bound water can be expanded upon heating under certain conditions. These minerals are not pure compounds but are of the nature of a mixture of silicates which soften and eventually fuse over a considerable temperature range. If minerals of this kind are heated comparatively slowly at relatively low temperatures, e. g. 200–600° C., they undergo gradual dehydration due to diffusion of water outwardly from the interior of the particle, the rate being sufficiently slow so that no deformation of the mineral occurs. Many of these minerals can be dehydrated to remove most of the bound water at temperatures below which they begin to soften.

If, however, particles of these minerals are subjected to temperatures above the softening point but generally below the fusion point and if this operation is carried out rapidly so that the bound water is driven off suddenly, the particles expand to volumes several times those of the original particles. Examination of such expanded particles indicates that they are made up of a mixture of cell-like structures composed of one or more sealed voids or bubbles, together with a varying proportion of particles made up of fragments of such cells which have been formed when the cells burst, due either to over expansion or crushing. Materials completely deyhdrated at low temperatures cannot be expanded by subsequent high temperature heating.

The bulk density of expanded perlitic material, whether it contains sealed voids or not, may vary from a value as low as about 1.5 lbs./cu. ft. upwardly. The unexpanded comminuted mineral has a bulk density of 60–75 lbs./cu. ft. depending on the particle size and distribution of sizes. The expanded mineral may be used for numerous purposes such as a dry insulation which is poured or blown into the space between walls, for example of buildings, refrigerators, or other hollow walled items; or can be used in mixtures of concrete using Portland cement, aluminite cement, magnesium oxychloride cements, asphalt, tar, and other types of binders including the thermosetting or thermo-plastic resins. Likewise, the particles can be coated with varying amounts of asphalt or other thermo-plastic material which tend to hold them together and can be used as a blown insulation.

It has been found that the characteristics desired in expanded perlite vary with the use to which the material is to be put. For certain purposes a material having the largest bulk volume obtainable, and containing comparatively small percentages of sealed voids is satisfactory because of the fact that the material has a very high insulating value. Such material is however extremely friable and must be handled with care to prevent its being broken down into small particles and dust, thereby losing some of the most desirable properties. Such materials can only be used where handling is at a minimum and where the material is subjected to but little mechanical shock. It has also been found that material having high bulk volume and having a large percentage of sealed voids is desirable particularly when used in compositions including a binder. The reason appears to be that when a binder is added to an expanded mineral particle aggregate having low sealed voids but a high bulk volume that the particle interstices or open spaces may become completely filled with the binder and that as a consequence the insulating value is reduced. Likewise, the bulk volume of the finished composition is less because the binder fills the open spaces of the particle aggregate and renders the mixture more dense. At the same time there is evidence that the breaking or tensile strength of the material is reduced in some instances.

On the other hand, a material having a high sealed void volume when mixed with a binder is not subject to the same difficulties. The liquid binder cannot penetrate into the sealed cells, or vesicules, but forms a film around the particles in such a way that the overall strength of the material is improved, the density is kept at a low value and the bulk volume of the composition is high, which is of great value particularly where the material is to be used in building structures and relatively light materials are required. The following example illustrates the effects referred to. Samples of plaster were made up by volume 80 parts of expanded perlite and 20 parts of plaster and mixed with water in the proper proportions to produce the minimum cast volume. It was found that the ultimate cast volume of the mixtures was related to the sealed void volume of the original expanded perlite. Thus a sample in which the expanded perlite had 1.04 cc./gm. of sealed voids gave a plaster under conditions of test of 80 cc. cast volume. Another sample of plaster made with expanded perlite of equal bulk volume, but with only 0.69 cc./gm. sealed void volume had a cast volume of only 65.5 cc. on a comparative basis. The plaster made with expanded perlite having the larger sealed void had the better insulating power. Thus a given weight of the composite plaster covered a larger area and gave better insulation than when perlite of low sealed void volume was used. This is a big advantage in the construction arts.

For certain purposes it is desirable that the overall strength of the expanded perlite be increased. However, it is undesirable to decrease bulk volume any more than can be avoided since the material having both a high bulk volume and a high sealed void volume is desirable.

In a broad embodiment, my invention comprises expanding and vesiculating a perlitic mineral under correlated conditions of temperature and time to produce a controlled sealed void volume and controlled bulk volume, and thereafter subjecting the expanded material to a lower temperature treatment for a time adequate to increase the crushing strength of the material but insufficient to decrease the bulk volume and sealed void volume substantially.

In a more specific embodiment, the invention comprises subjecting a perlitic mineral to expansion and vesiculation at a temperature in the range of about 800° to 1300° C. at a time of less than about 2 minutes and then further heating the product at a temperature of about 650° to 1050° C. to increase the strength of the material with a minimum reduction in sealed void volume and generally in bulk volume.

It has been found that the sealed voids produced when the perlite is expanded, are just what the words imply, voids in which very low pressure exists, that is, an evacuated bubble. Under ideal conditions, the voids would be under pressure approximately that of the partial pressure of residual water remaining in the bubble. Actually during the popping operation, the pressure of the vaporized water within certain particles becomes so high at the moment of popping that the softened glassy material making up the particles does not expand to form closed bubbles but some of them form and then burst. Between the condition in which the void is formed to its maximum size without bursting, and that at which the bubble bursts, there may be a series of conditions in which minute holes appear in the walls of some of the bubbles permitting some of the steam to escape and, after cooling, permitting air to be more or less readily drawn into the bubble so that it is no longer evacuated. All of these effects occur regardless of the temperature at which the material is expanded.

The ideal condition, when the material is to be used as an insulator, is one in which all of the material expands to form sealed voids and all of the sealed voids are evacuated to the maximum extent. This is based upon the fact that an evacuated space has higher insulating values than a space filled with quiescent gas.

The method used for determining the sealed void volume of a sample of expanded perlite is by means of a glass laboratory apparatus wherein the actual volume only of the particles of the sample is measured by their displacement of air when the pressure is reduced from atmospheric to approximately 0.5 of an atmosphere. This volume value includes that of solid material comprising fragments and broken bubbles or open cells as well as the volume of the closed cells and bubbles which comprise sealed voids. The calculation of the sealed void volume per unit mass of sample is done by subtracting the specific volume of sample solids from the apparent specific volume of the particles found as described. The solids specific volume used is calculated from the particle density measurement of the crushed crude mineral which has been dehydrated by heating to 1000° C. slowly enough to avoid any expansion thereof.

The method used for determining the bulk volume of the expanded perlite is by measuring the gravity settled volume of a sample which has been poured through a funnel into a laboratory 25 cc. capacity glass graduate.

The present invention, therefore, permits the expansion of the mineral under conditions such that there is produced an expanded perlite having a high bulk volume up to the maximum possible value, from a given quantity of the raw charge, together with a maximum sealed void volume, without regard to the possibility of producing a material having "pin-point" openings in some of the sealed bubbles, or having cell walls so thin that gas can permeate therethrough. This is followed by a tempering treatment at a lower temperature under conditions such that the cell walls remain just soft enough so as to shrink slightly without collapsing. Because of the lower temperature, the pressure within individual cells is reduced and there any "pin-point" openings (which may approach molecular size) are sealed due to the slight shrinkage of the walls inwardly. There will also be a tendency to thicken the cell walls in those places where they are excessively thin.

At the same time, because of the lower temperature of the second step, the glassy material making up the cell walls is more viscous and can be handled for a longer time without the particles fusing down to globules or drastically reducing the sealed void volume due to a tendency in that direction. Because of increasing the viscosity by lowering the temperature after expansion, changes in the sealed void volume can be avoided or minimized.

The maximum sealed void volume is reached (at a given temperature of expansion) shortly before the maximum bulk volume is reached. If the expansion step is stopped at maximum sealed void volume but short of maximum bulk volume, the tempering step can be carried out with little change in either bulk volume or sealed void volume. If maximum bulk volume is attained it is possible to temper to improve the strength of particles by fusing the jagged edges of burst bubbles, thus reducing bulk volume somewhat but without changing sealed void volume. This results in a stronger particle. It would seem however, that the tempering step may improve the strength of particles because it relieves strains set up in the thin walls of the cells, by an annealing action. This may also be accompanied by a slight thickening of the walls which improves the strength also.

This has, therefore, a plural effect of retaining the high sealed void volume, the high bulk volume, the maximum number of sealed voids per unit volume, preventing future loss of vacuum due to gradual penetrations of air through pin-point openings or by diffusion or permeation through the cell walls, and finally of increasing the strength of the weaker cells. As a result a superior product for use per se as an insulator but more particularly for use in compositions employing a binder such as plaster, cement, asphalt, etc. is produced. The tempering step may be carried out at a temperature below 1000° C. but in any case, 50–200° below the temperature used in the expansion step. This is done so that the tempering is carried out with the interiors of the sealed bubbles at reduced pressure. When the lower temperatures are used the time for tempering must necessarily be longer. In general a temperature 100° C. lower than the expansion temperature is satisfactory.

One method used is to place a silica boat containing a thin layer of perlitic mineral in a muffle furnace held at a temperature such that when the furnace reaches equilibrium after charging it is at the desired temperature. Thus the perlite is expanded at 1200° C. in about 45 seconds of heating. The sample is then withdrawn and rapidly transferred to another furnace at the desired tempering temperature and held there for the stated time, then withdrawn and cooled.

A sample of perlite was expanded at 1200° C. to a bulk volume of about 5 cubic centimeters per gram, corresponding to about 12 pounds per cubic foot, and a sealed void volume of about 0.75 cubic centimeter per gram.

If the expanded perlite is heated for an additional period of one minute after expansion at the same temperature, the bulk volume decreases rapidly to about three cubic centimeters per gram and the sealed void volume to about 0.28 cubic centimeter per gram.

When the product produced by expanding at 1200° C. is tempered at 1100° C. for one minute, the bulk volume decreases to about 3.5 cubic centimeters per gram and sealed void volume to about 0.32 cubic centimeter per gram.

Similarly when the 1200° C. product was tempered at 1000° C. for one minute the bulk volume decreased to 4.8 cubic centimeters per gram and the sealed void volume to 0.72 cubic centimeter per gram. After two minutes' tempering at 1000° C. the bulk volume decreased to 4.5 cubic centimeters per gram and the sealed void volume to 0.70 cubic centimeter per gram. The resistance of the particles to crushing improved by about 25%.

After standing for several weeks the tempered sample (1000° C.) had lost substantially none of the vacuum within the sealed bubbles. The untempered samples had lost a substantial part of the vacuum within the bubbles.

A sample of the expanded perlite heated at 650° C. for thirty minutes showed improvement in strength and ability to maintain vacuum, but below this temperature little or no benefit was observed, even at thirty minutes' heating time.

I have found that the amount of bulk volume and sealed void volume produced by expanding a given perlite can be controlled, within limits, by proper correlation of temperature and time of heating. Thus at 1200° C. the heating time should be less than about one minute; at 1100° C., less than about two minutes; at 1000° C., less than about four minutes.

There is also a trend to produce lighter bulk weight material at the higher temperatures than at lower temperatures, providing the time is properly chosen.

When the maximum bulk volume and sealed void volumes are attained (at given operating conditions) continued heating ultimately causes a sharp decrease in both bulk volume and sealed void volume, especially at the high temperatures.

The maximum sealed void volume is not necessarily attained at the lower temperatures. The exact conditions under which the maximum possible sealed void volume is attainable will depend upon a number of factors. These include composition of the perlitic mineral, particle size, rate of heating, character of preheating, amount of bound water present, etc. In general, however, the maximum possible sealed void volume appears to be attainable at a temperature of 1000° C. or higher. At temperatures below this the sealed void volume is generally below the possible maximum.

If expansion is carried out at a time and temperature correlated to produce a high sealed void volume, up to the maximum possible value, (the bulk volume being high but not necessarily the maximum possible) and the temperature then reduced as described, the particle strength can be greatly improved without substantial sacrifice in sealed void volume or bulk volume. Thus by heating a −20+40 mesh perlite at 1200° C. for 30 seconds, a maximum sealed void volume may be attained. If the temperature is immediately reduced to about 650–1000° C., and held there for several minutes, the particle strength is improved without loss of sealed void volume or bulk volume.

At the lower temperatures the material is less sensitive to volume changes than at the higher temperatures. However, the maximum bulk volume is not usually attainable at the lower temperatures of expansion. Therefore if perlite is expanded at a temperature of about 1200° C. for a time of less than about 45 seconds so as to produce a maximum bulk volume and at the same time, a high sealed void volume, and then cooled somewhat, that this material can be improved as to particle strength by heating at a lower temperature in the neighborhood of about 650° C. to 1000° C. for a period of several minutes. The time depends on the actual temperatures used as well as on the individual varieties of minerals that may be treated.

The strength of the expanded material can be improved without substantial sacrifices in bulk volume and sealed void volume. There may be some minor decrease in sealed void volume and bulk volume but this decrease is readily controllable due to the fact that the time factor at the lower temperature is more easily controlled since the material is less sensitive at the lower temperatures.

It has, therefore, been found that by this two-step heating process that the sealed void and bulk volumes of the final product are greater than can be obtained by conducting the initial expansion step at the lower temperature. The strength of the material is greater than can be obtained in a single step operation to obtain a given bulk volume and sealed void volume.

The exact temperature and time conditions selected for the expansion step will also vary depending upon the mesh size of any given perlite charging stock. Thus, a material having a larger mesh size can be expanded at a somewhat lower temperature than a material having a smaller mesh size, probably due to the fact that the diffusion of moisture from the interior of the particle requires less time in the small particles than in the larger particle. Small particles may become dehydrated before expansion, or at least maximum expansion, can occur unless the up-heat period is very short and the expansion period is also short and at a high temperature.

The conditions used will also depend upon the chemical composition and the bound water content of the original mineral. Certain perlitic minerals, for example, will expand but very little at a temperature as low as 800° C. and therefore must be treated at temperatures above this temperature, preferably above 900° C., in order to effect the desired expansion. In general, a somewhat higher temperature will be required for perlitic minerals than for certain other types of minerals which expand readily at 800–900° C.

Likewise the particular heating method employed will effect the results obtained thereby, although the general shape of the heating curve and the kind of results obtainable are similar. Where substantially instantaneous heating can be obtained, the time factor, say, at 1200° C. may be of the order of a few seconds and often as low as 0.25 to two seconds. Since shrinkage may begin to occur as soon as the mineral has expanded to the desired extent, the expanded material must be cooled to the tempering temperature, as by removal from the expansion zone, to prevent further change in bulk volume and sealed void volume.

Any suitable apparatus may be used to carry out the process. These include rotating kilns, furnaces in which the particles are contacted with heated gases, radiant heaters, or devices in which the particles are expanded by direct contact with heated surfaces.

The invention should not be construed as limited to the exact conditions or apparatus described or exemplified.

I claim as my invention:

1. A process for expanding an expandable volcanic glass which comprises rapidly heating said glass to about 900° to about 1200° C. for a time sufficient to expand said glass and produce a maximum of sealed voids, the time for expanding being less than four minutes, rapidly cooling the expanded particles to a temperature of 650° to 1000° C. but in any event at least 50° below the expansion temperature, maintaining it at said temperature for at least one minute to temper the particles throughout, thereby relieving strains and increasing strength without substantial reduction in sealed void volume.

2. The process of claim 1 wherein the volcanic glass is perlite.

GLENROY STECKER.

REFERENCES CITED

The following references are of record in the file of this patent:

UNITED STATES PATENTS

| Number | Name | Date |
|---|---|---|
| 2,139,378 | Meyers et al. | Dec. 6, 1938 |
| 2,306,462 | Moorman | Dec. 29, 1942 |
| 2,424,330 | Robertson | July 22, 1947 |

OTHER REFERENCES

Perlite, Bureau of Mines Publication IC 7364, 9 pages.

Chem. and Met. Engineeering, vol. 52, page 140.